United States Patent
Itoh et al.

[11] Patent Number: 5,976,412
[45] Date of Patent: Nov. 2, 1999

[54] FLUORESCENT MATERIAL

[75] Inventors: Shigeo Itoh; Hitoshi Toki; Yoshitaka Kagawa; Yoshitaka Sato; Hisashi Kanie, all of Chiba-ken, Japan

[73] Assignee: Futaba Denshi Kogyo K.K., Japan

[21] Appl. No.: 08/837,823

[22] Filed: Apr. 22, 1997

[51] Int. Cl.⁶ .................................................. C09K 11/62
[52] U.S. Cl. ........................ 252/301.4 R; 282/301.6 R; 501/96.1; 423/409
[58] Field of Search ................... 117/952; 252/301.4 R, 252/301.6 R; 501/96.1; 257/102, 103; 423/409

[56] References Cited

U.S. PATENT DOCUMENTS

| | | | |
|---|---|---|---|
| 5,319,121 | 6/1994 | Blum | 501/96.5 |
| 5,625,202 | 4/1997 | Chai | 257/103 |
| 5,650,641 | 7/1997 | Sassa et al. | 257/102 |
| 5,652,438 | 7/1997 | Sassa et al. | 257/103 |
| 5,693,963 | 12/1997 | Fujimoto et al. | 257/102 |

FOREIGN PATENT DOCUMENTS 4-10666  1/1992  Japan ..................................... 257/102

*Primary Examiner*—C. Melissa Koslow
*Attorney, Agent, or Firm*—Breiner & Breiner

[57] ABSTRACT

A fluorescent material is described which remains uninfluenced in the presence of oxygen during fabrication, allows a highly efficient light emission due to the concentration of donors being adjustable as appropriate, and is excellent in giving a bright light and having a long life. The fluorescent material is represented by the formula $Ga_{1-x}In_xN{:}M,X$, wherein $0 \leq x < 0.8$, M is at least one element selected from the group of Be, Mg, Ca, Sr, Ba, Zn, Cd and Hg, and X is at least one element selected from the group of C, Si, Ge, Sn and Pb. The fluorescent material preferably has concentration ranges (mol %) of the elements M and X of $0.005 < M < 0.7$ and $0.002 < X < 0.8$. The starting materials utilized for preparing the fluorescent material are substances devoid of oxygen, preferably $(SiH_aN_b)_n$ where $a=1–3$, $b=0$ or 1, and $n=$an integer of 1 or more.

2 Claims, 3 Drawing Sheets

GaN:Mg,Si$^x$

FLUORESCENT MATERIAL

BACKGROUND OF THE INVENTION

1. Field of the Invention

This invention relates to a fluorescent material which is produced after a solid solution comprising gallium nitride and indium nitride have been doped with a doping substance, or to a fluorescent material which emits light by electron beam excitation, has a property to emit light different in color according to what materials are chosen for the constituents, and has an excellently long life.

2. Description of the Related Art

Japanese Unexamined Patent Publication No. 51-41686 discloses a fluorescent material which is produced after $Ga_2O_3$ has been nitrified in an atmosphere of ammonia to produce GaN, and then GaN, being made as a substrate, has been doped with Cd a dopant. This fluorescent material is not applied, however, for the purpose of light emission by electron beam excitation, and the said reference does not give any mention of the method how to use the fluorescent material to emit light by electron beam excitation.

When $Ga_2O_3$ is nitrified in an atmosphere of nitrogen, nitrification of $Ga_2O_3$ starts from the surface. When the system is heated to a high temperature, the nitrified surface is oxidized again. Namely, gallium nitride has a tendency to easily lose nitrogen. This is the reason why $Ga_2O_3$ becomes an n type, has a very low resistance and emits light even when not doped.

Emission of light from gallium nitride occurs as a result of the pairing between donors (D) and acceptors (A). Acceptors are formed after Zn, Mg, etc. are added. Donors are nitrogen deficits naturally produced. When a conventional procedure is used for increasing the concentration of donors, it results in the increase of nitrogen deficits of the material, which will degrade the crystal regularity of the material. As seen from this, with gallium nitride produced by a conventional procedure, it is impossible to adjust the number of donors to a desired value.

Further, gallium nitride has a possibility of being oxidized in the presence of oxygen. Accordingly, if $Ga_2O_3$ or an oxide is used as a starting material, it is quite difficult to convert it completely into a nitride compound. Even if this is feasible, the resulting gallium nitride will be inferior in quality because residual oxygen therein will have an adverse effect on light emission.

SUMMARY OF THE INVENTION

This invention intends to provide a fluorescent material which remains uninfluenced in the presence of oxygen during fabrication, allows a highly efficient light emission because the concentration of donors can be adjusted as appropriate, and is excellent in giving a bright light and having a long life.

A fluorescent material as described is represented by $Ga_{1-x} In_x N:M, X$ (where $0 \leq x < 0.8$, M is at least one element chosen from the group comprising Be, Mg, Ca, Sr, Ba, Zn, Cd and Hg, and X is at least one element chosen from the group comprising C, Si, Ge, Sn and Pb).

A fluorescent material as described is characterized by being derived from a fluorescent material as described above, wherein the concentration ranges (mol %) of the elements M and X are $0.005 < M < 0.7$ and $0.002 < X < 0.8$, respectively.

A fluorescent material as described is characterized by being derived from a fluorescent material as described above, wherein the concentration ranges (mol %) of the elements M and X are $0.01 < M < 0.3$ and $0.005 < X < 0.3$, respectively.

A fluorescent material as described is characterized by being derived from starting materials which are substances devoid of oxygen.

A fluorescent material as described is characterized by being derived from a material including the element Si and is $(SiH_aN_b)_n$ which is devoid of oxygen (where a=1–3, b=0 or 1 and n=an integer of 1 or more).

DETAILED DESCRIPTION OF THE PREFERRED EMBODIMENT

Figure 1:
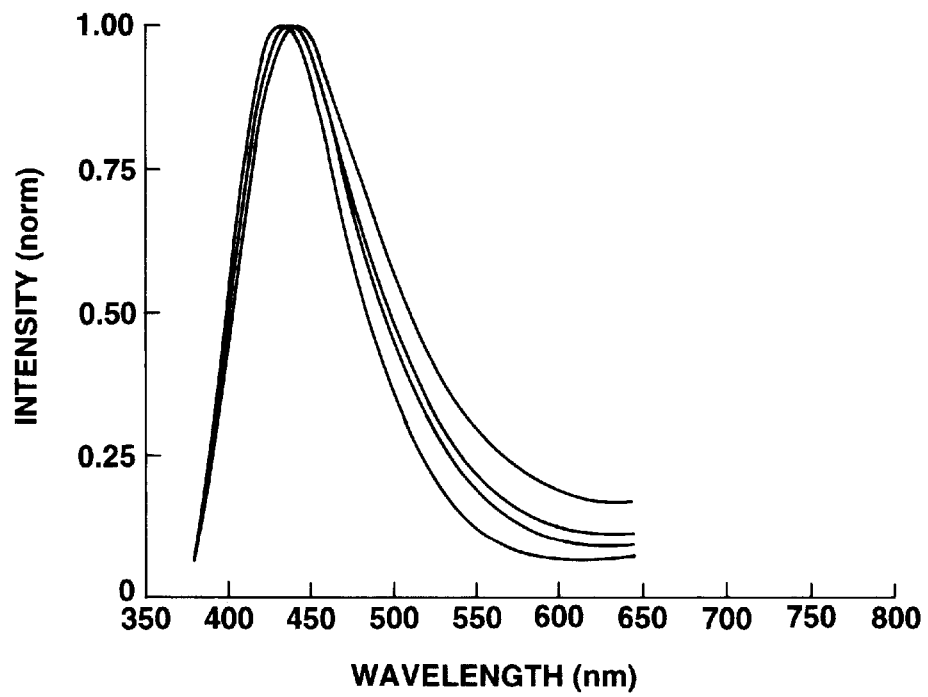
FIG. 1 shows the effect of Example 1 of this invention.

The fluorescent material of this invention improves the efficiency of light emission, because it allows the concentration of donors to be adjusted by controlling the addition of an element to act as donors. Further, it is made from materials which are inherently unresponsive to oxygen. It is represented by the chemical formula of $Ga_{1-x} In_x N:M, X$ (where $0 \leq x < 0.8$). The element X which acts as the donor may include preferably C, Si, Ge, Sn, Pb, etc., or elements belonging to the fourth family of the periodic table. The element M to act as an additive element may preferably include Be, Mg, Ca, Sr, Ba, Zn, Cd and Hg. Particularly, when Si is added to the fluorescent material, use of Polysilazane (TM, Tonen Co., Ltd.) is preferred. Polysilazane is perhydropolysilazane represented by the formula $(SiH_aN_b)_n$ (where a=1–3, b=0 or 1 and n=an integer of 1 or more). When this substance is used, the number of Si atoms to be added to the fluorescent material can be precisely adjusted. Further, as this substance does not contain C and 0, it is useful for production of a nitride. It is worthy of notice here that $GeS_2$ should be used for addition of Ge and $SnCl_2$ for addition of Sn. If addition of the donor substance is adjusted properly, it will be possible to produce a fluorescent material which is excellent in emitting bright light with different colors under electron beam excitation, and in having a long life.

(1) EXAMPLE 1

GaN:Mg, Si

A 23.5 g (0.1 mol) of $Ga_2S_3$ was weighed, to which was added 0.02 g (0.1 mol %/Ga) of $MgCl_2$. Then, 0.05 g of 20% solution of Polysilazane was added so that the concentrations of Si and Mg became equal. The mixture was mixed well, and was transferred, on a quartz board, into a quartz tube. The system was maintained at 1100° C. for 10 hours while ammonia was allowed to flow through the quartz tube at a rate of 10 ml/min, to produce GaN:Mg, Si.

The same procedure was followed except that, although the amount of Mg was kept constant, the amount of 20% solution of Polysilazane was varied so that the amount of Si varied between 0.001 mol % to 10 mol %, to produce a plurality of specimens varying in the Si content. The shape of particles constituting the fluorescent material of this invention produced as above, when examined under SEM, looked like thin flakes, in contrast with needles as is seen for a conventional fluorescent material made of gallium nitride.

A specimen with no Si being added, and another specimen to which $SiO_2$ had been added instead of Polysilazane were also prepared.

These specimens were bonded with an organic binder onto anode conductors on glass substrates, and baked in the air at 500° C., to remove the binder. Thus, the anode substrate with a fluorescent layer formed thereupon was prepared. On the top surface of the anode substrate were placed a control electrode and a cathode. On the top surface of the anode substrate was bonded a vessel member in the form of a box with frit glass to form an externally sealed enclosure. The interior of the enclosure was evacuated to form a vacuum, and the enclosure was sealed at about 500° C. (B, to form a fluorescence indicator tube. A voltage of about 50V was applied to the anode conductor, to allow the fluorescent material to emit light. The characteristics of the light were compared among different specimens for evaluation.

Figure 2:
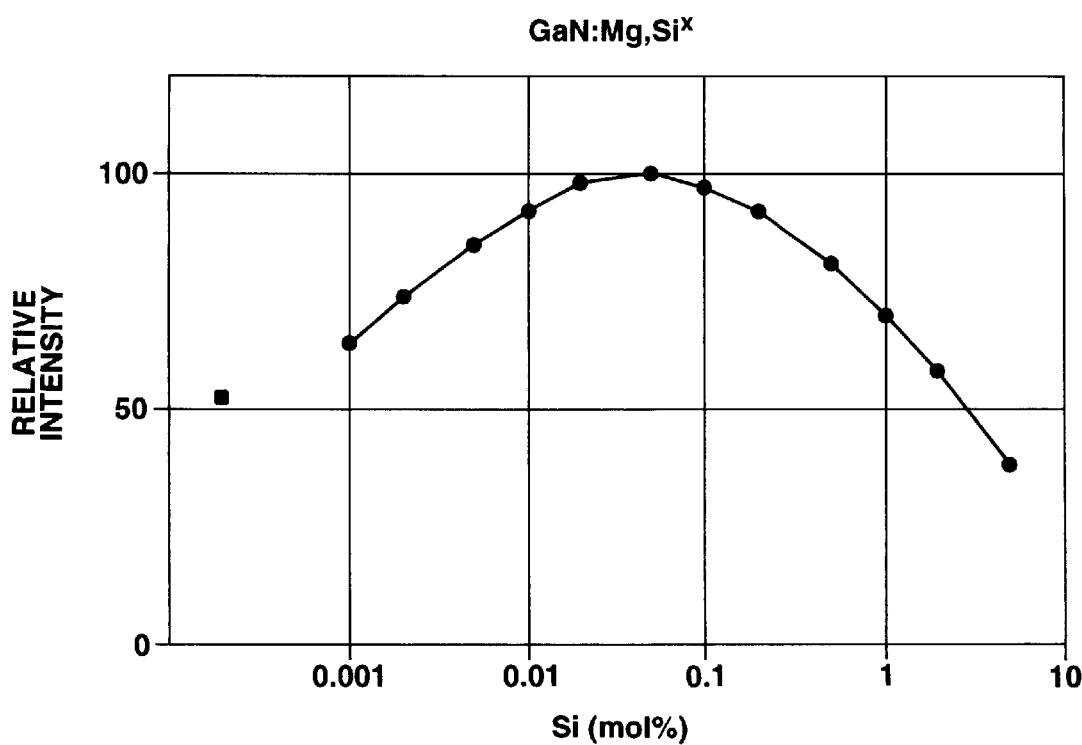
FIG. 2 shows the effect of Example 1 of this invention.

As shown in FIG. 1, the light from all the specimens looked blue. As shown in FIG. 2, the light intensity varied according to the amount of Si doped: when the doped amount of Si is small, the light intensity becomes low; and when Si is added too much, extra Si crystalizes and the light intensity is reduced, and light emission from the surface of fluorescent material becomes uneven, and spots indicative of charge-up appear here and there on the surface. The sample doped with $SiO_2$ gave light whose intensity was about 75% that from the sample doped with Polysilazane.

(2) EXAMPLE 2

GaN:Mg, Ge

A 23.5 g (0.1 mol) of $Ga_2S_3$ was weighed, to which was added 0.01 g (0.05 mol %/Ga) of $MgCl_2$. Then, 0.014 g of $GeS_2$ was added so that the concentrations of Mg and Si became equal. The mixture was mixed well, and was transferred, on a quartz board, into a quartz tube. The system was maintained at 1100° C. for 10 hours while ammonia was allowed to flow through the quartz tube at a rate of 10 ml/min, to produce GaN:Mg, Ge.

A specimen with no Ge being added, and another specimen to which $GeO_2$ had been added instead of $GeS_2$ were also prepared.

These specimens were used to produce the same fluorescence indicator tubes as in Example 1. A voltage of about 50V was applied to the anode conductor, to allow the fluorescent material to emit light. The characteristics of the light were compared among different specimens for evaluation.

The light from all the specimens was blue in color. When the light intensity emitted by the specimen not doped with Ge was taken as 100%, the light from the specimen of this example was 170%, suggesting that doping with Ge is effective in enhancing the intensity of emitted light. The specimen doped with $GeO_2$ gave light whose intensity was 130%.

(3) EXAMPLE 3

$Ga_{0.7}In_{0.3}N$:Zn, Ge

A 16.4 g of $Ga_2S_3$ and 9.8 g of $In_2S_3$ were combined, to which were added 0.02 g of ZnS (0.1 mol %/Ga). Then, 0.027 g of $GeS_2$ was added so that the concentrations of Zn and Ge became equal. The mixture was mixed well, and was transferred, on a quartz board, into a quartz tube. The system was maintained at 1150° C. for 6 hours while ammonia was allowed to flow through the quartz tube at a rate of 10 ml/min, to produce $Ga_{0.7}InN$:Zn, Ge.

The same procedure was followed except that, although the amount of Ge was kept constant, the amount of ZnS was adjusted so that the amount of Zn varied between 0.001 mol % to 10 mol %, thereby to produce a plurality of specimens varying in the Zn content. A specimen to which $SiO_2$ had been added instead of Polysilazane was prepared. Another plurality of specimens of which the amount of Ge was varied from 0.01 to 5 mol %, although the amount of Zn being kept constant, were also prepared.

These specimens were combined with PVA to give slurry solutions. The slurry solution was applied onto an ITO electrode on a substrate. This preparation was baked at 480° C. in the air, to produce an anode substrate with a fluorescent layer formed thereupon. A cathode substrate which had a cathode for discharging electricity formed on its inner surface was prepared. The inner surface of the cathode substrate was placed opposite with a specified distance to the top surface of the anode substrate. The periphery of the two substrates was closely sealed with spacers inserted between the two, to form an externally sealed enclosure. The interior of the enclosure was evacuated to produce a vacuum, and the air-vent was sealed to produce a field emission cathode (FED). A voltage was applied to the anode conductor, to allow electrons to be released from the cathode for discharging electricity, and to hit upon the fluorescent layer on the anode so that the fluorescent layer emits light. The characteristics of the light were compared among different specimens for evaluation.

Figure 3:
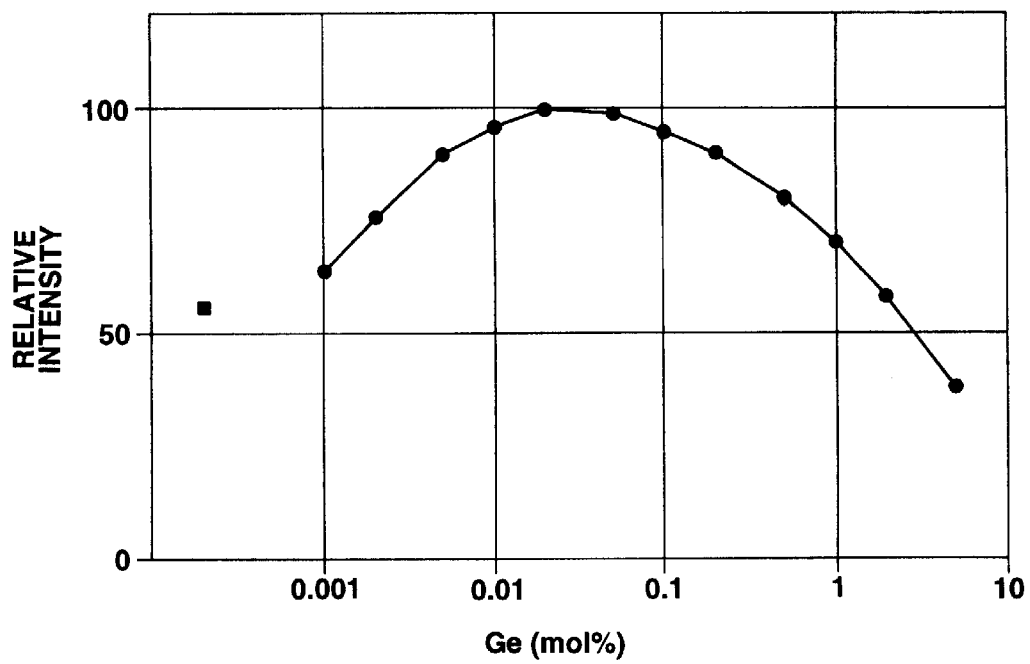
FIG. 3 shows the effect of Example 3 of this invention.
Figure 5:
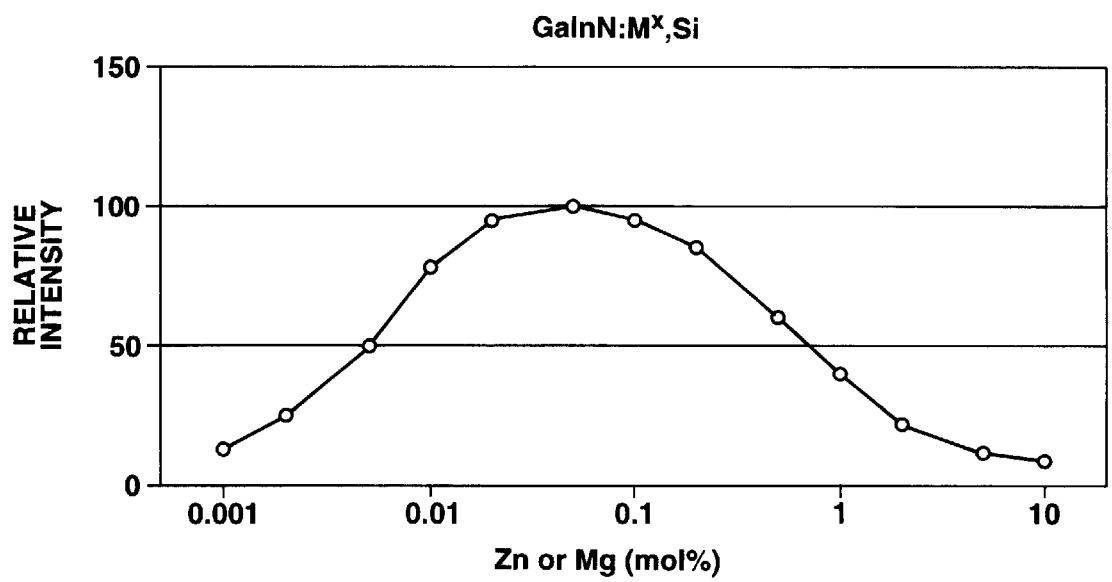
FIG. 5 shows the effect of Examples 3 and 5 of this invention.
Figure 6:
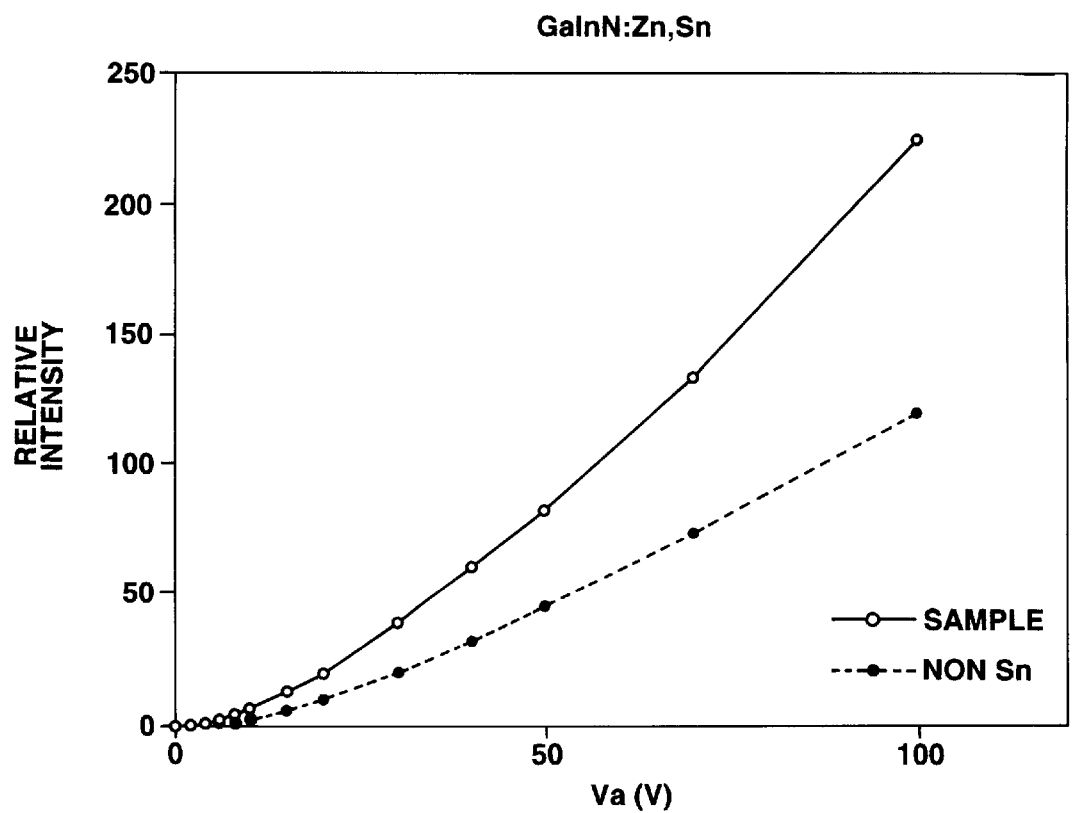
FIG. 6 shows the effect of Example 6 of this invention.

As shown in FIG. 3, the light intensity varied according to the amount of Ge doped: when the doped amount of Ge is small, the light intensity becomes low; and when Ge is added too much, the light intensity is reduced. The same was observed for Zn: as seen in FIG. 5 the relative light intensity varies according to the doped amount with an optimum value at the center.

(4) EXAMPLE 4

$Ga_{0.7}In_{0.3}N$:Mg, Zn, Si

A 16.4 g of $Ga_2S_3$ and 9.8 g of $In_2S_3$ were combined, to which were added 0.01 g of $MgCl_2$ (0.05 mol %/Ga) and 0.01 g of ZnS (0.05 mol %/Ga). Then, 0.05 g of 20% aqueous solution of Polysilazane was added so that the concentration of Si became equal to the summed concentrations of Zn and Ge. The mixture was mixed well, and was transferred, on a quartz board, into a quartz tube. The system was maintained at 1180° C. for 6 hours while ammonia was allowed to flow through the quartz tube at a rate of 10 ml/min, to produce $Ga_{0.7}InN$:Mg, Zn, Si. A specimen with no Si added was also prepared.

FEDs were produced using these specimens as in Example 1. A voltage of about 100V was applied to the anode conductor, to allow the fluorescent material to emit light, and the characteristics of the light were compared among the specimens for evaluation.

The specimens of this example emitted light green in color. When the light intensity emitted by the specimen not doped with Si was taken as 100%, the light from the specimen of this example was 180%, suggesting that doping with Si is effective in enhancing the intensity of emitted light.

(5) EXAMPLE 5

GaN:Mg, Sn

A 23.5 g (0.1 mol) of $Ga_2S_3$ was weighed, to which was added 0.02 g (0.1 mol %/Ga) of $MgCl_2$. Then, 0.04 g of $SnCl_2$ was added so that the concentration of Si became equal to that of Mg. The mixture was mixed well, and was transferred, on a quartz board, into a quartz tube. The system was maintained at 1200° C. for 10 hours while ammonia was allowed to flow through the quartz tube at a rate of 10 ml/min, to produce GaN:Mg, Sn.

The same procedure was followed except that, although the amount of Sn was kept constant, the amount of Mg was varied from 0.001 mol % to 10 mol %, to produce a plurality of specimens varying in the Mg content. A specimen with no Sn added was also prepared. Another plurality of specimens of which the amount of Sn was varied from 0.001 to 5 mol %, although the amount of Mg being kept constant, were also prepared.

These specimens were used to produce the same fluorescence indicator tubes as in Example 1. A voltage of about 50V was applied to the anode conductor, to allow the fluorescent material to emit light. The characteristics of the light were compared among the specimens for evaluation.

Figure 4:
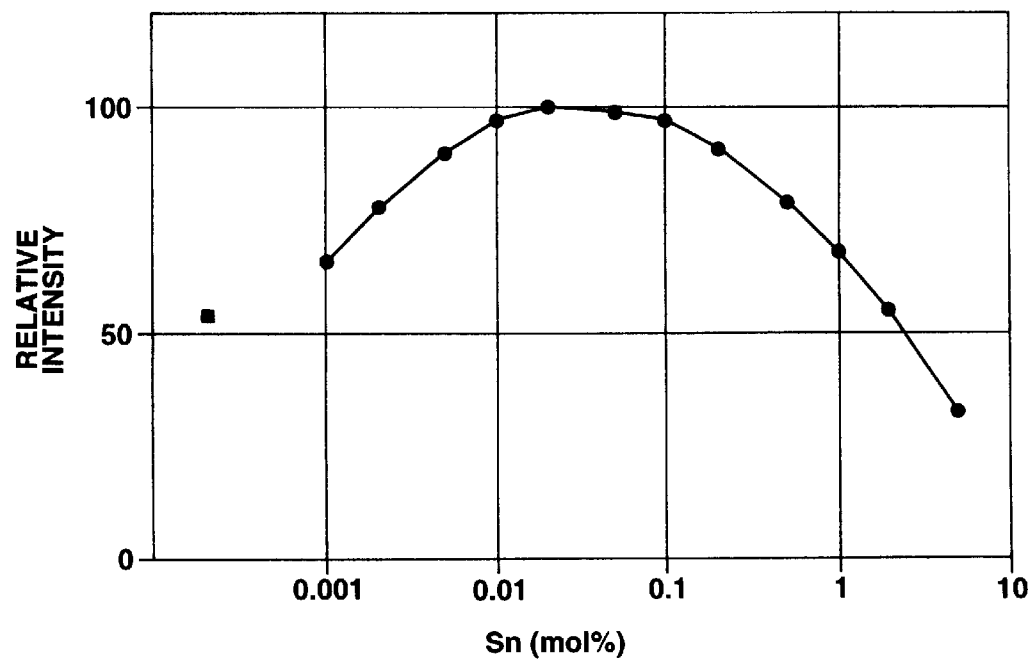
FIG. 4 shows the effect of Example 5 of this invention.

As shown in FIG. 4, the light intensity varied according to the amount of Sn doped: when the doped amount of Sn is small, the light intensity becomes low; and when Sn is added too much, the light intensity is reduced. The same was observed for Mg: the relative light intensity, as shown in FIG. 5, varies according to the doped amount with an optimum value at the center.

(6) EXAMPLE 6

$Ga_{0.5}In_{0.5}N$:Zn, Sn

A 11.7 g of $Ga_2S_3$ and 16.3 g of $In_2S_3$ were combined, to which was added 0.004 g of ZnS (0.02 mol %/Ga). Then, 0.008 g of $SnCl_2$ was added so that the concentration of Sn became equal to that of Zn. The mixture was mixed well, and was transferred, on a quartz board, into a quartz tube. The system was maintained at 1150° C. for 8 hours while ammonia was allowed to flow through the quartz tube at a rate of 10 ml/min, to produce $Ga_{0.5}$InN:Zn,Sn. A specimen with no Sn added was also prepared.

FEDs were produced using these specimens as in Example 1. Voltages varying in intensity of about 0–100V were applied to the anode conductor, to allow the fluorescent material to emit light, and the characteristics of the light were compared among different voltages for evaluation.

The fluorescent bodies of this example emitted light orange in color. The specimen with Sn doped gave light whose relative intensity was two times as strong as that from the specimen with no Sn doped, suggesting that Sn doping is effective for enhancing emission of light.

For Mg and Zn used in the examples described above, the concentration M preferably has a range of 0.005<M<0.7, more preferably 0.01<M<0.3. Be, Ca, Sr, Ba, Cd and Hg may be used instead of Mg and Zn.

For Si, Ge and Sn used in the examples described above, the concentration X (mol %) preferably has a range of 0.002<X<0.8, more preferably 0.005<X<0.3. C or Pb may be used instead of Si, Ge and Sn.

The fluorescent material of this invention uses, as a substrate, $Ga_{1-x} In_xN$ ($0 \leq x<0.8$), and dopes the substrate with an additive element such that the concentration of a donor can be adjusted as appropriate. Accordingly, the fluorescent material of this invention is excellent in the light emitting property and in giving a long life, and is capable, under electron beam excitation, of emitting light different in color according to the kind of additive element applied. In addition, when starting materials devoid of oxygen are used for preparation of the present product, no adverse effects due to the presence of oxygen will be encountered during manufacture.

What is claimed is:

1. A method for producing a fluorescent composition having a formula:

$$Ga_{1-x}In_xN:M,X$$

wherein $0 \leq x<0.8$, M is Zn or Mg, and X is Si, Ge or Sn, comprising providing a starting material of gallium sulfide and optionally indium sulfide; and mixing said starting material with zinc sulfide and/or magnesium chloride, and germanium sulfide, tin chloride or a polysilazane; and heating said mixture in an ammonia-containing atmosphere at a temperature of 1100° C.–1200° C. for 6–10 hours to provide said fluorescent composition.

2. A method according to claim 1 wherein the polysilazane is a silicon compound having a formula $(SiH_aN_b)_n$ wherein a=1–3, b=0 or 1, and n represents an integer having a value of 1 or more.

* * * * *